United States Patent [19]

Uchikoga

[11] Patent Number: 5,454,084
[45] Date of Patent: Sep. 26, 1995

[54] METHOD AND APPARATUS FOR CONTROLLING BUS IN COMPUTER SYSTEM TO WHICH EXPANSION UNIT IS CONNECTABLE

[75] Inventor: Hiroshi Uchikoga, Tokyo, Japan

[73] Assignee: Kabushiki Kaisha Toshiba, Kawasaki, Japan

[21] Appl. No.: 77,951

[22] Filed: Jun. 18, 1993

Related U.S. Application Data

[63] Continuation of Ser. No. 780,226, Oct. 22, 1991, abandoned.

[30] Foreign Application Priority Data

Oct. 22, 1990 [JP] Japan ................... 2-281771

[51] Int. Cl.$^6$ ................................................. G06F 13/00
[52] U.S. Cl. ...................... 395/281; 364/DIG. 1; 364/229; 364/230.4; 364/238.3; 364/239.3; 364/240; 364/240.3; 364/240.4; 364/240.5
[58] Field of Search ...................... 395/325, 725, 395/200, 250, 275, 800

[56] References Cited

U.S. PATENT DOCUMENTS

| | | | |
|---|---|---|---|
| 4,453,215 | 7/1984 | Reid | 395/575 |
| 4,456,956 | 7/1984 | El-Gohary | 395/200 |
| 4,680,674 | 7/1987 | Moore | 361/686 |
| 4,769,764 | 9/1988 | Levanon | 361/680 |
| 4,788,658 | 11/1988 | Hanebuth | 364/708.1 |
| 4,845,611 | 7/1989 | Turlakov et al. | 395/250 |
| 4,860,198 | 8/1989 | Takenaka | 395/325 |
| 4,882,702 | 11/1989 | Struger et al. | 395/275 |
| 4,975,838 | 12/1990 | Mizuno | 395/275 |
| 5,014,186 | 5/1991 | Chisholm | 395/275 |
| 5,113,369 | 5/1992 | Kinoshita | 395/325 |
| 5,148,389 | 9/1992 | Hughes | 395/800 |

FOREIGN PATENT DOCUMENTS

| | | |
|---|---|---|
| 0325856 | 8/1989 | European Pat. Off. . |
| 89/11692 | 11/1989 | WIPO . |

*Primary Examiner*—Jack B. Harvey
*Assistant Examiner*—Ayaz R. Sheikh
*Attorney, Agent, or Firm*—Oblon, Spivak, McClelland, Maier, & Neustadt

[57] ABSTRACT

When the expansion unit is connected to the computer system to which the expansion bus controller is connectable, the bus in the computer system is controlled by the expansion bus controller of the expansion unit in place of the bus controller of the computer system. When the expansion unit is connected to the option device and data reception and transmission is performed between the option device and the computer system, the bit conversion of received data is performed by the expansion bus controller in accordance with the number of bits of received data and the bus width of the bus where data is transmitted.

17 Claims, 4 Drawing Sheets

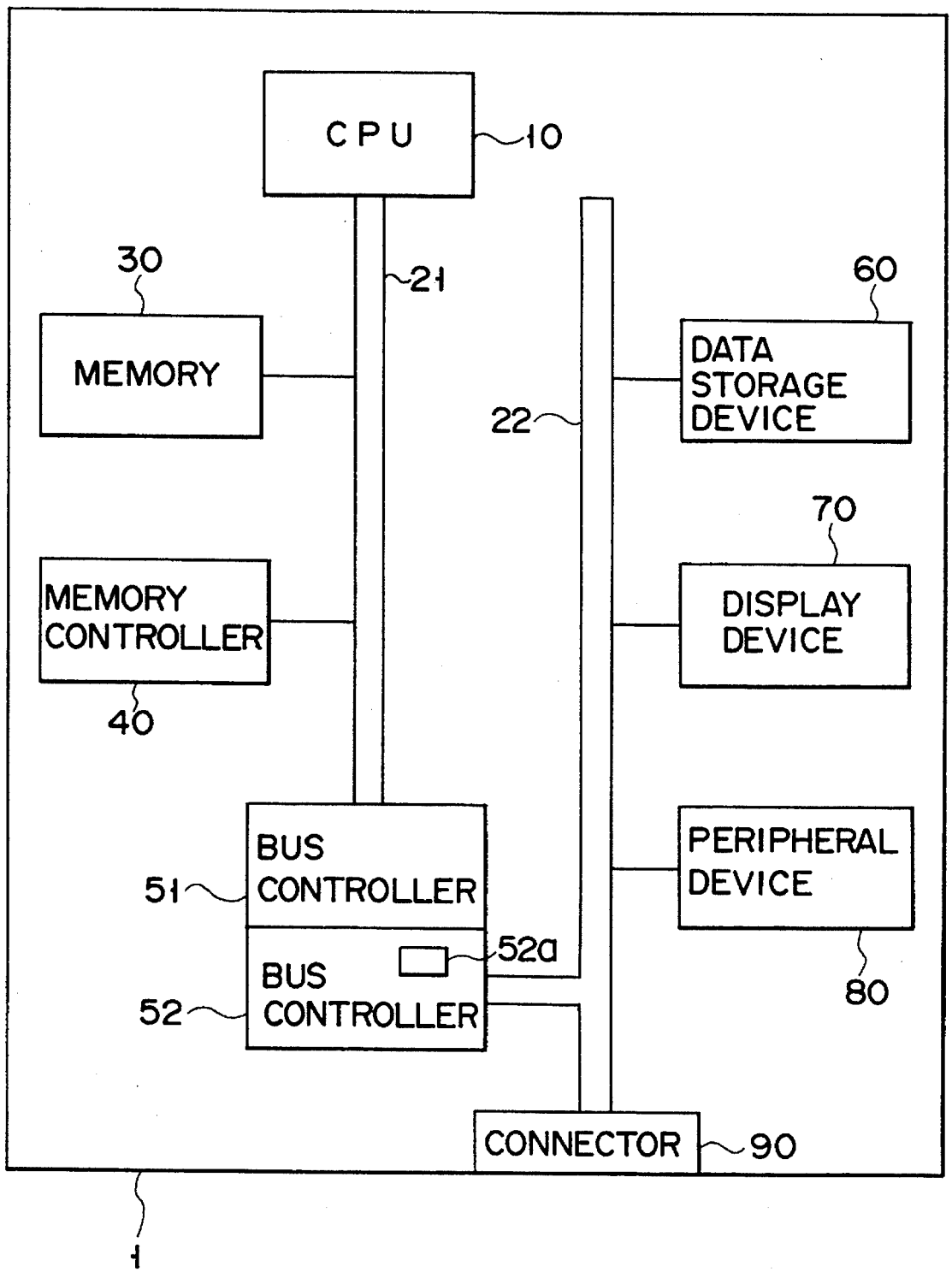
F I G. 1

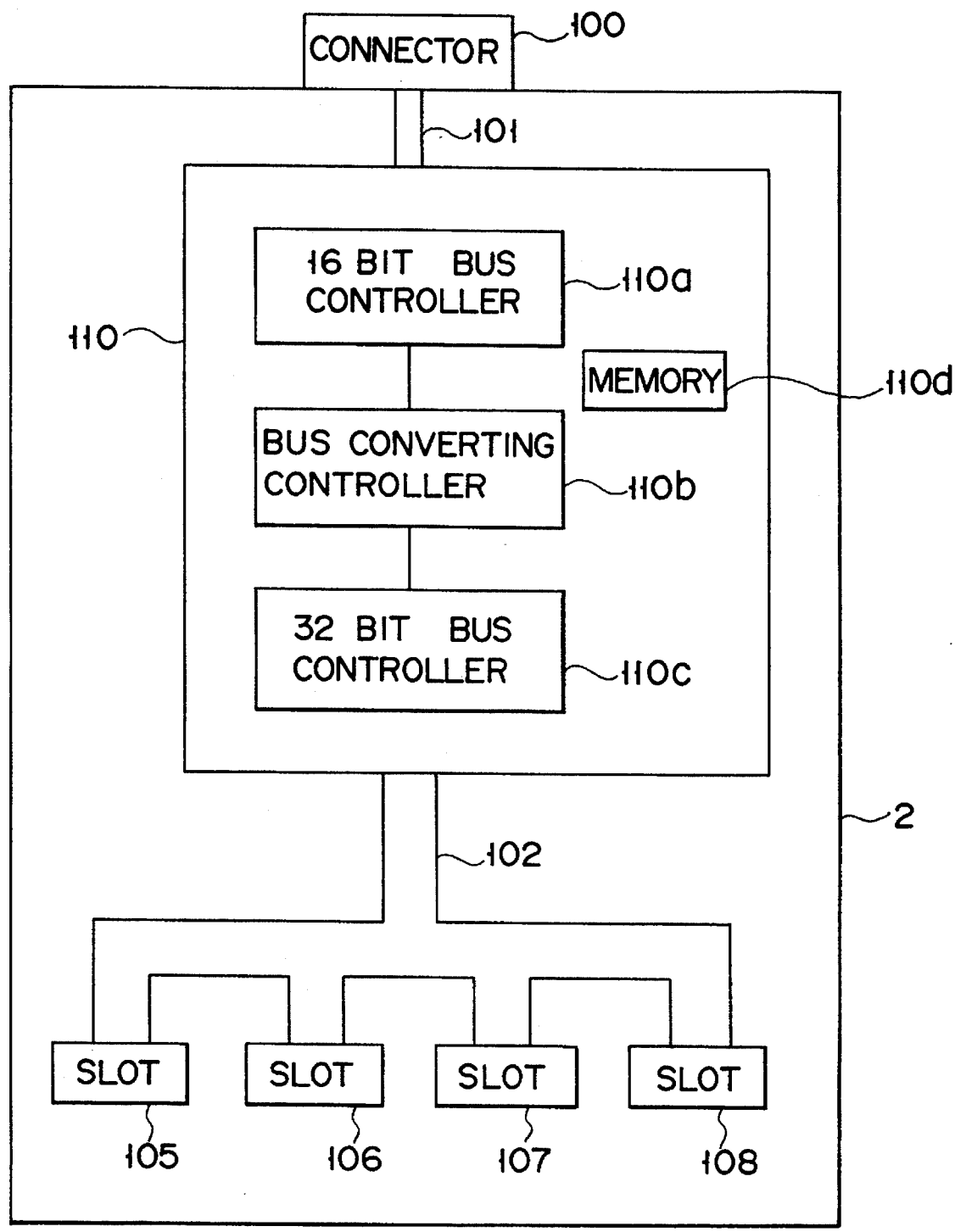
F I G. 2

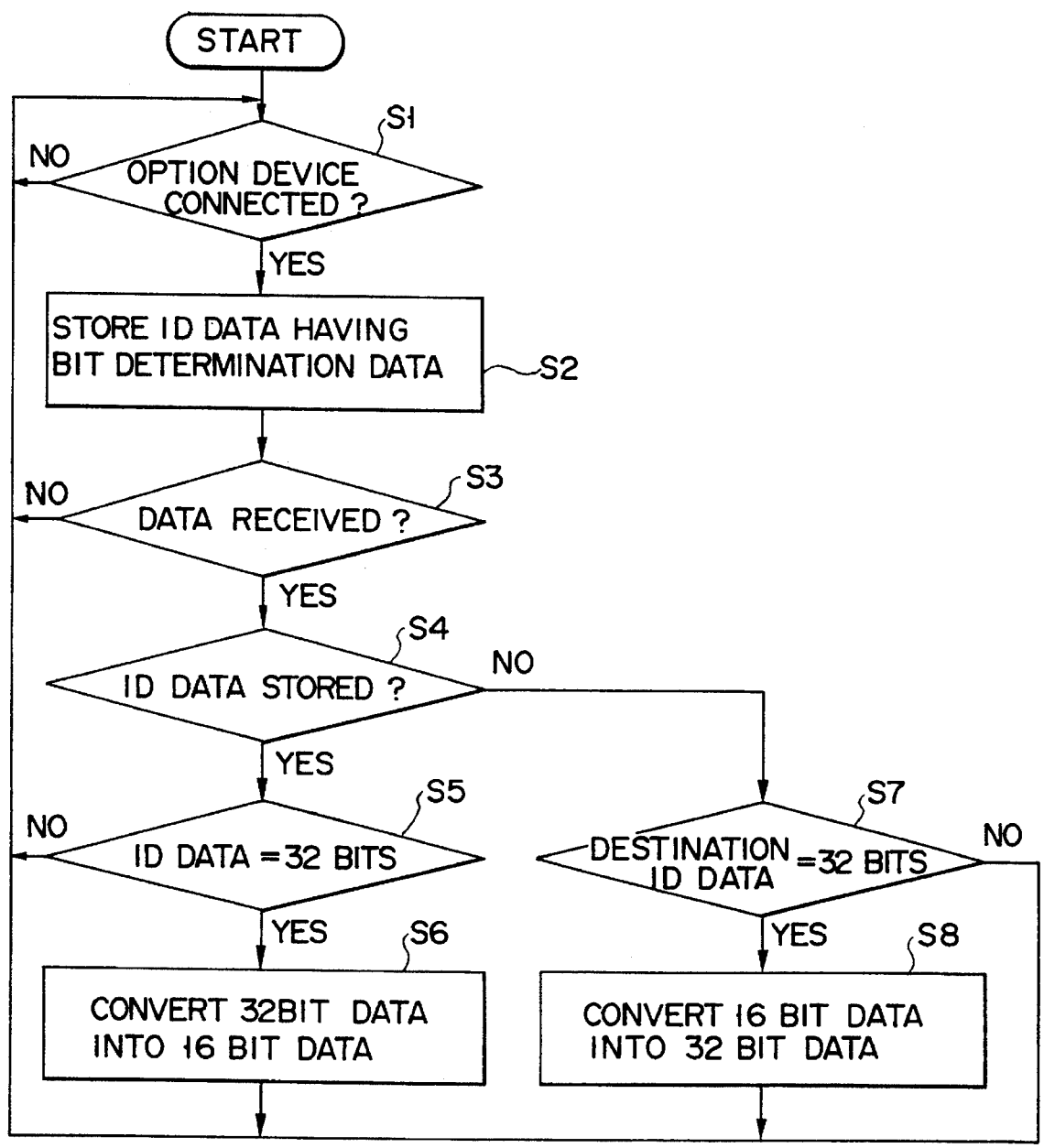
F I G. 3

METHOD AND APPARATUS FOR CONTROLLING BUS IN COMPUTER SYSTEM TO WHICH EXPANSION UNIT IS CONNECTABLE

This application is a continuation of application Ser. No. 07/780,226, filed on Oct. 22, 1991, now abandoned.

BACKGROUND OF THE INVENTION

1. Field of the Invention

The present invention relates to a method and apparatus for controlling bus in a computer system to which an expansion unit is connectable.

2. Description of the Related Art

Conventionally, since an expansion unit for connecting an option device to a personal computer is built in a body of the personal computer, a type of a bus architecture is one and almost all architecture correspond to a standard.

However, in such a personal computer, there are the following problems.

More specifically, since the expansion unit is built in the body of the personal computer, only one type of the bus architecture can be equipped. Due to this, even if a plurality of bus architectures, for example, a 16 bus architecture and a 32 bit bus architecture exist, the option device for a bus architecture different from the bus architecture being used cannot be utilized. In a case where a 16 bit bus architecture is equipped in the personal computer, a 32 bit but architecture cannot be equipped therein. Due to this, a 32 bit option device cannot be connected to the personal computer.

Also, in a case where the bus architecture is built in the body of the computer, the performance of the computer is limited. In other words, even if the performances of a CPU, a peripheral device and the like are excellent, there is a case that these performances cannot sufficiently reflect the entire system since these performances depend on the built-in bus architecture.

For the above reason, in a case where the expansion unit is not connected in a personal computer to which the expansion unit is connectable, it is desirable that a bus control can be performed by a built-in bus controller in the personal computer. Or, in a case where the expansion unit is connected, it is desirable that the bus control can be performed by a bus controller of the expansion unit in place of the built-in bus controller.

SUMMARY OF THE INVENTION

The object of the present invention is to provide a method and apparatus for controlling bus in a computer system to which an expansion unit is connectable.

According to the present invention, there is provided a computer system to which an expansion unit is connectable, comprising a system bus; and a system bus controller for controlling the system bus, and wherein when the expansion unit having a plurality of buses and an expansion bus controller for controlling the plurality of buses is connected to the computer system, the system bus is controlled by the expansion bus controller in place of the system bus controller.

Also, according to the present invention, there is provided a method for controlling bus in a computer system to which an expansion unit is connectable, the expansion unit having an expansion bus and an expansion bus controller for controlling the expansion bus, the computer having a system bus and a system bus controller for controlling the system bus, comprising the steps of: determining whether the expansion unit is connected to the computer system; inhibiting control of the system bus by the system bus controller when the expansion unit is connected to the computer system; and controlling the system bus by the expansion bus controller in place of the system bus controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the structure of a computer system according to an embodiment of the present invention;

FIG. 2 is a block diagram showing the structure of an expansion unit which is connectable to the computer system according to the embodiment of the present invention;

FIG. 3 is a flow chart of a bus control by an expansion bus controller of the expansion unit.

DETAILED DESCRIPTION OF THE PREFERRED EMBODIMENTS

Figure 4:
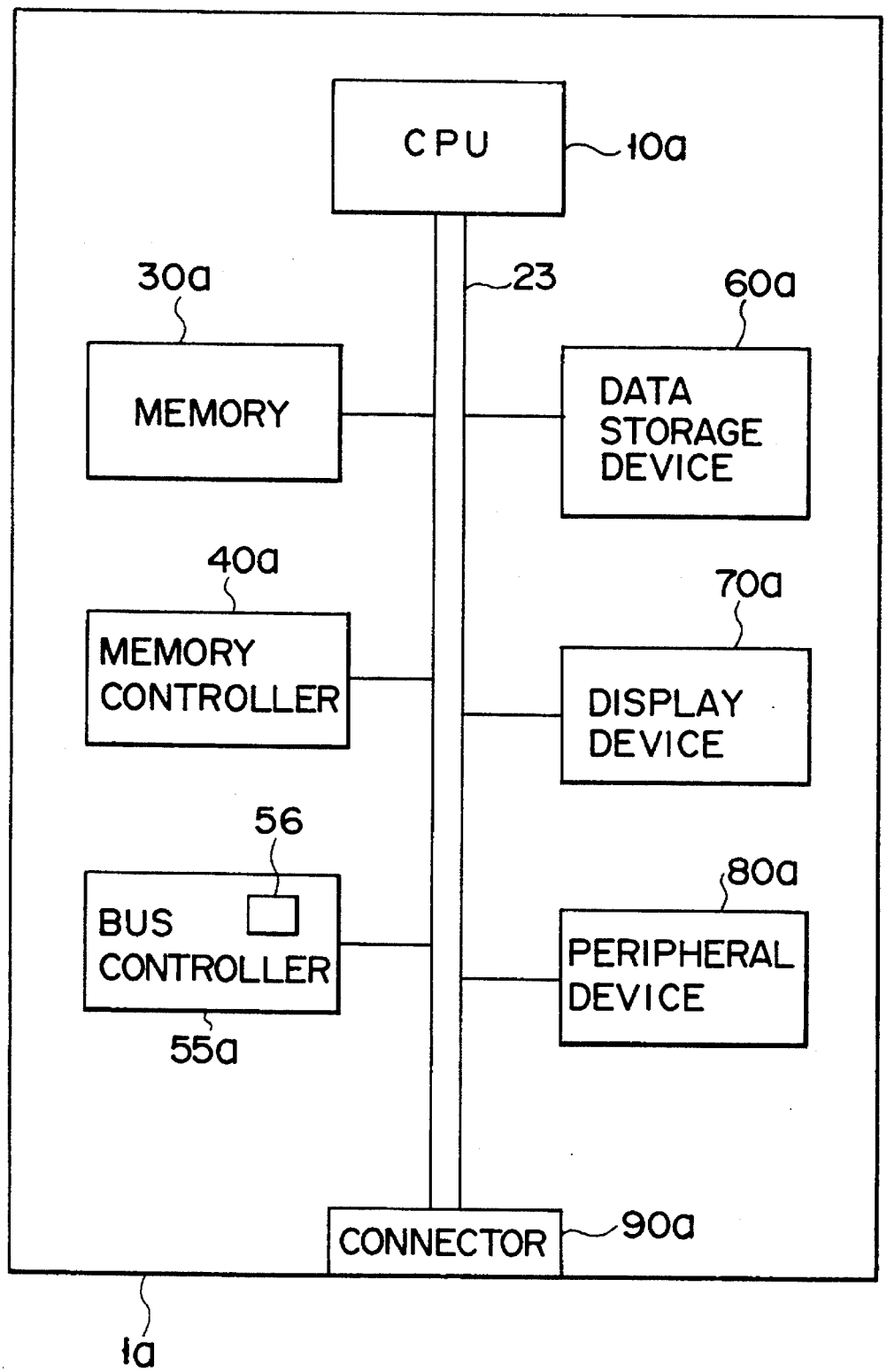
FIG. 4 is a block diagram showing the structure of another computer system according to the embodiment of the present invention.

The embodiments of the present invention will be described with reference to the drawings.

FIG. 1 is a block diagram showing the structure of a computer system according to an embodiment of the present invention. In this drawing, a computer system 1 comprises a CPU 10 controlling an entire system, buses 21 and 22, a memory 30, a memory controller 40, bus controllers 51, 52 controlling the buses 21 and 22, a data storage device 60, a display device 70, a peripheral device 80, and a connector 90. FIG. 2 is a block diagram showing the structure of an expansion unit which is connectable to a computer system according to the embodiment of the present invention. In FIG. 2, the expansion unit 2 comprises a connector 100, buses 101 and 102, an expansion bus controller 110, and slots 105, 106, 107, and 108.

The bus 21 is connected to the CPU 10, the memory 30, the memory controller 40, and the bus controller 51. The bus 22 is connected to the bus controller 52, the data storage device 60, the display device 70, the peripheral device 80, and the connector 90. In this embodiment, a bus width of the bus 22 is 16 bits. A connector 100 of the expansion unit 2 is connectable to the connector 90. Therefore, the bus 22 is can be connected to the bus 101 of the expansion unit 2 via the connectors 90 and 100.

The bus controllers 51 and 52 respectively comprise a bus control circuit, a DMA (direct memory access) controller, an interrupt controller, a serial/parallel port controller, a timer and the like (which are not shown). The bus controller 51 further comprises an expansion unit connection flag 52a in addition to these components. The expansion unit connection flag 52a is used to represent whether the expansion unit 2 is connected to the computer system 1. In a case where the expansion unit 2 is connected to the computer system 1, the expansion unit connection flag 52a is set. Also, in a case the expansion unit 2 is disconnected from the computer system 1, the expansion unit connection flag 52a is reset.

The determination whether the expansion unit 2 is connected to the computer system 1 is, for example, as follows.

More specifically, in a predetermined register (not shown) of the expansion unit 2, there is stored in advance identification data for identifying the expansion unit itself to be connected. The bus controller 52 reads identification data against the predetermined register of the expansion unit 2. If identification data is obtained by this reading, it is determined that the expansion unit 2 is connected to the computer system 1.

when the expansion unit connection flag 52a is set, the control of the bus 22 is performed by the expansion bus controller 110 in place of the bus controller 52. Therefore, until the expansion unit connection flag 52a is reset, the bus controller 52 does not control the bus 22. Whether the expansion unit 2 is connected to the computer system 1, the bus controller 51 controls the bus 21.

The data storage device 60 is controlled by the device controller (not shown), and comprises, for example, a hard disc drive, a floppy disc drive and the like.

The display device 70 is controlled by the display controller (not shown), and comprises, for example, a LCD (liquid crystal display), a CRT (cathode ray tube) display, and the like.

The periphery device 80 comprises, for example, a keyboard, a keyboard controller, a printer, a printer controller, a real time lock serving as a timer module, BIOSROM (basic input and output system read only memory), and the like.

The connector 90 and the connector 100 are connected to each other in order to connect the expansion unit 2 to the computer system 1.

The expansion bus controller 110 comprises a 16 bit bus controller 110a, a bus converting controller 110b, a 32 bit bus controller 110c, and a memory 110d. The 16 bit bus controller 110a controls the bus 101. The 32 bit bus controller 110c controls the bus 102. In this embodiment, the bus width of the bus 101 is 16 bits, and that of the bus 102 is 32 bits. As mentioned above, when the expansion unit 2 is connected to the computer system 1, since the expansion unit connection flag 52a of the bus controller 52 is set, the 16 bit bus controller 110a also controls the bus 22.

The bus converting controller 110b converts the number of bits in data received from the computer system 1 or that of bits in data received from the option device connected to the slots 105, 106, 107, and 108 into a predetermined number of bits. In this embodiment, 16 bit data is converted into 32 bit data, or 32 bit data is converted into 16 bit data.

The memory 110d, as described later, stores ID data of each option device to be connected to slots 105, 106, 107, and 108.

The slots 105, 106, 107 and 108 are respectively used to connect the 16 bit or 32 bit option device. The option device to be connected comprises an ID register (not shown) storing ID data for identifying the option device itself in advance. ID data includes a bit determination data representing whether the number of bits in data used in the connected option device is 16 bits or 32 bits.

Next, a bus control in the computer system 1 to which the expansion unit 2 is connectable will be explained.

When the expansion unit 2 is not connected to the computer system 1, the expansion unit connection flag 52a of the bus controller 52 is in a reset state, so that the bus 22 is controlled by the bus controller 52. The bus 21 is controlled by the bus controller 51.

On the other hand, when the expansion unit 2 is connected to the computer system 1, the expansion unit connection flag 52a of the bus controller 52 is set. Therefore, control of the bus 22 by the bus controller 52 is inhibited, and the bus 22 is controlled by the 16 bit bus controller 110a. Similar to the above, the bus 21 is controlled by the bus controller 51.

The operation of the expansion bus controller 110 of the expansion unit 2 will be explained using FIG. 3. FIG. 3 is a flow chart of bus control by the expansion bus controller of the expansion unit. In this embodiment, there will be explained a bus control in a case in which data is received and transmitted between a device (or a component) in the computer system 1 and an option device to be connected to a slot of the expansion unit 2.

In step S1, it is determined that the option device is connected to one of the slots 105, 106, 107, 108. In step S1, when the option device is connected to the slot, ID data (having bit determination data) is read out from the ID register of the connected option device, and the read out ID data is stored in the memory 110d (step S2).

In step S3, it is determined whether data is received. In step S3, when data is received, it is determined whether ID data of a transmitting station of the received data is stored in the memory 110d. In other words, it is determined whether the transmitting station is the device (or component) in the computer system 1 or the option device connected to the slot.

In step S4, when ID data of the transmitting station is stored in the memory 110d, it is determined that the transmitting station of the received data is the option device. In step S5, by referring to the content of the memory 110d, it is determined whether ID data of the option device indicates 32 bits. In this case, since the transmitting station is the option device, a destination of the received data is a desired device (or component) in the computer system 1.

In step S5, when the ID data indicates 32 bit, it is determined that the received data is 32 bits. However, since the bus 22 in the computer system 1 is 16 bits, the received data cannot be directly transmitted to the bus 22. Therefore, the received 32 bit data is converted into 16 bit data (step S6), and the converted data is transmitted to the bus 22. In other words, when data is transmitted to the bus 22, 32 bit data is divided into 16 bits in order to obtain two 16 bit data.

In step S4, when ID data of the transmitting station is not stored in the memory 110d, it is determined that the transmitting station is a device (or component) in the computer system 1. Due to this, in step S7, by referring to the content o the memory 110d, it is determined whether ID data of a destination indicates 32 bits. Since the transmitting station of the received data is the device (component) in the computer system 1, the received data is 16 bits.

In step S7, when ID data of the destination indicates 32 bits, the received 16 bit data is converted into 32 bit data (step S8). In other words, when data is transmitted to the bus 102, two 16 bit data are combined in order to obtain 32 bit data.

For example, when a 16 bit option device is connected to the slot 105 in a state that the expansion unit 2 is connected to the computer system 1, ID data of the connected 16 bit option device is stored in the memory 110d. When data is to be transmitted from the connected option device to the computer system 1, since it is determined that the data to be transmitted is 16 bits by referring to the memory 110d, bit conversion is not performed. Therefore, 16 bit data is transmitted to the bus 22 without executing the bit conversion.

Moreover, when a 32 bit option device is connected to the slot 106 in a state that the expansion unit 2 is connected to the computer system 1, ID data of the connected 32 bit option device is stored in the memory 110d. When data is to be transmitted to the computer system 1 from the connected option device, since it is determined that the data to be transmitted is 32 bits by referring to the memory 110d, 32 bit data is converted into 16 bit data. Therefore, the converted 16 bit data is transmitted to the bus 22.

As mentioned above, when the expansion unit is connected to the computer system, the bus is controlled by the expansion bus controller of the expansion unit in place of the bus controller of the computer system. The option device of the bus architecture different from the bus architecture of the computer system can be connected to the expansion unit.

FIG. 4 is a block diagram showing the structure of another computer system according to the embodiment of the present invention. In FIG. 4, a computer system 1a comprises a CPU 10a, a bus 23, a memory 30a, a memory controller 40a, a bus controller 55a having an expansion bus connection flag 56, a data storage device 60a, a display device 70a, a peripheral device 80a, and a connector 90a.

As compared with the computer system 1 shown in FIG. 1, each component is connected to one bus 23 in the computer system 1a. When the expansion unit 2 is connected to the computer system 1a, the expansion unit connection flag 56 is set and the bus 23 is controlled by the expansion bus controller 110 in place of the bus controller 55a. The bus control by the expansion bus controller 110 is performed in the same as the above.

As explained above, in the computer to which the expansion unit is connectable, when the expansion unit is connected, the 16 bit bus control in the computer system is performed by the expansion bus controller of the expansion unit in place of the bus controller in the computer system. Since 16 bit or 32 bit option device can be connected to the expansion unit, the bus control can be performed even if 16 bit option device or 32 bit option device is connected to the expansion unit. In the above embodiments, 16 bit or 32 bit option device is used. However, it is possible to use the option device other than the 16 bit or 32 bit option device. Moreover, the bus width of the computer system is not limited to 16 bits. The present invention can be applied to a computer system having a bus width other than 16 bits.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. In a computer system to which an expansion unit is adapted to be removably connected, the computer system having a system bus and a system bus controller for controlling the system bus, the system bus having a system data bus width, the expansion unit comprising:

a first expansion bus having a first expansion data bus width coincident with the system bus width, which is adapted to be removably connected to the system bus;

a first expansion bus control means for controlling the first expansion bus;

a second expansion bus having a second expansion data bus width different from the system data bus width;

a second expansion bus control means for controlling the second expansion bus;

data converting means connected between the first and second expansion bus control means for converting first data corresponding to the first expansion data bus width into second data corresponding to the second expansion data bus width and converting the second data into the first data; and at least one slot for connecting an option device with the second expansion bus, and wherein when the expansion unit is connected to the computer system, the system bus is controlled by the first expansion bus control means in place of the system bus controller.

2. The system according to claim 1, wherein the system bus controller comprises a flag representing whether the expansion unit is connected to the computer system, and when the flag is set, control of the system bus by the system bus controller is inhibited and the system bus is controlled by the first expansion bus control means.

3. The system according to claim 2, wherein when the flag is reset, control of the system bus by the first expansion bus control means is inhibited, and the system bus is controlled by the system bus controller.

4. The system according to claim 1, wherein the expansion unit further comprises memory for storing ID data used to identify the option device when the option device is connected to the slot.

5. The system according to claim 4, wherein when the option device is connected to the slot and the option device outputs the second data to the second expansion bus control means through the second expansion bus, the data converting means converts the second data into first data in accordance with ID data to be stored in the memory.

6. In a computer system to which an expansion unit is adapted to be removably connected, the computer system having a system bus controller for controlling the system bus, the system bus having a system data bus width, the expansion unit to which an option device is adapted to be removably connected includes an expansion but having an expansion data bus width different from the system data bus width, an expansion bus controller for controlling the expansion bus and a data converter for converting first data corresponding to the system data bus width into second data corresponding to the expansion data bus width and converting the second data into the first data, the method comprising the steps of:

determining whether the expansion unit is connected to the computer system;

inhibiting the control of the system bus by the system bus controller when the expansion unit is connected to the computer system;

controlling the system bus by the expansion bus controller in place of the system bus controller;

determining whether the option device is connected the slot, and converting the second data into the first data when the option device is connected to the expansion unit and the option device outputs the second data toward the computer system; and converting the first data into the second data when the option device is connected to the expansion unit and the computer system outputs to the first data toward the option device.

7. The method according to claim 6, wherein the system bus controller comprises a flag representing whether the expansion unit is connected to the computer system, and when the expansion unit is connected to the computer system, the flag is set, control of the system bus by the system bus controller is inhibited, and the system bus is controlled by the expansion bus controller.

8. The method according to claim 7, wherein when the expansion unit is disconnected from the computer system, the flag is reset, control of the system bus by the expansion bus controller is inhibited, and the system bus is controlled by the system bus controller in place of the expansion bus controller.

9. The method according to claim 6, wherein the expansion unit further comprises a memory for storing ID data for identifying the option device when the option device is connected, and when the option device is connected to the expansion unit and the option device outputs the second data toward the computer system, the data converter converts second data into the first data in accordance with ID data to be stored in the memory.

10. A computer system to which an expansion unit is adapted to be removably connected, comprising:

a first data bus;

a central processor electrically connected to the first data bus;

a first bus control means for controlling the first data bus;

a second data bus;

a second bus control means for controlling the second data bus;

determining means for determining whether or not the expansion unit is connected to the computer system;

stopping control means for stopping the second bus control means from controlling the second data bus in response to the determining means indicating that the expansion unit is connected to the computer system; and starting control means for starting the second bus control means to control the second data bus in response to the determining means indicating that the expansion unit is disconnected from the computer system, and wherein the expansion unit includes a third bus control means and the second data bus is controlled by the third bus control means in place of the second bus control means when the expansion unit is connected to the computer system.

11. The system according to claim 12, wherein the second bus control means comprises a flag which is set when the expansion unit is connected to the computer system or is reset when the expansion unit is disconnected from the computer system, and the second data bus is not controlled by the second bus control means when the flag is set or is controlled by the second bus control means when the flag is reset.

12. A portable computer system comprising:

an expansion unit including a first connector, an expansion bus electrically connected to the first connector and an expansion bus controller controlling the expansion bus; and a portable computer removably connected to the expansion unit, comprising:

a first bus, a central processor electrically connected to the first bus, a first bus controller controlling the first bus, a second connector removably connected to the first connector, a second bus electrically connected to the second connector and removably connected to the expansion bus through the first and second connectors, a second bus controller controlling the second bus, a detector, electrically connected to the second connector, detecting whether the expansion unit is connected to the portable computer, and a inhibiting means for inhibiting the second bus controller so as to move the control of the second bus from the second bus controller to the expansion bus controller when the detector detects the expansion unit is connected to the portable computer.

13. A portable computer system according to claim 12, wherein the expansion bus includes a first data bus width, the second bus includes a second data bus width which is different from the first data bus width, and the expansion bus controller includes a bus width convertor which converts the first data bus width to the second data bus width.

14. A computer system to which an expansion unit is adapted to be removably connected, comprising:

a data bus;

a first bus control means for controlling the first data bus;

determining means for determining whether or not the expansion unit is connected to the computer system;

stopping control means for stopping the first bus control means from controlling the data bus in response to the determining means indicating that the expansion unit is connected to the computer system; and starting control means for starting the first bus control means to control the data bus in response to the determining means indicating that the expansion unit is disconnected from the computer system, and wherein the expansion unit includes a second bus control means and the data bus is controlled by the second bus control means in place of the first bus control means when the expansion unit is connected to the computer system.

15. The system according to claim 14, wherein the first bus control means comprises a flag which is set when the expansion unit is connected to the computer system or is reset when the expansion unit is disconnected from the computer system, and the first data bus is not controlled by the first bus control means when the flag is set or is controlled by the first bus control means when the flag is reset.

16. A portable computer system comprising:

an expansion unit including a first connector, a first bus electrically connected to the first connector and a first bus controller controlling the first bus; and a portable computer removably connected to the expansion unit, comprising:

a first bus, a second connector removably connected to the first connector, a second bus electrically connected to the second connector and removably connected to the first bus through the first and second connectors, a second bus controller controlling the second bus, a detector, electrically connected to the second connector, detecting whether the expansion unit is connected to the portable computer, and a inhibiting means for inhibiting the second bus controller so as to move the control of the second bus from the second bus controller to the first bus controller when the detector detects the expansion unit is connected to the portable computer.

17. A portable computer system according to claim 16, wherein the first bus includes a first data bus width, the second bus includes a second data bus width which is different from the first data bus width, and the first bus controller includes a bus width convertor which converts the first data bus width to the second data bus width.

* * * * *